United States Patent
Davis, III et al.

(10) Patent No.: US 9,858,966 B2
(45) Date of Patent: *Jan. 2, 2018

(54) DIGITAL VIDEO RECORDER OPTIONS FOR EDITING CONTENT

(71) Applicant: AT&T INTELLECTUAL PROPERTY I, L.P., Atlanta, GA (US)

(72) Inventors: John P. Davis, III, Marietta, GA (US); Jeffrey Mikan, Atlanta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/460,780

(22) Filed: Mar. 16, 2017

(65) Prior Publication Data
US 2017/0186464 A1    Jun. 29, 2017

Related U.S. Application Data

(63) Continuation of application No. 14/810,890, filed on Jul. 28, 2015, now Pat. No. 9,646,646.

(51) Int. Cl.
*G11B 27/34* (2006.01)
*G11B 27/031* (2006.01)
(Continued)

(52) U.S. Cl.
CPC ............ *G11B 27/031* (2013.01); *G11B 27/34* (2013.01); *H04N 21/4147* (2013.01);
(Continued)

(58) Field of Classification Search
None
See application file for complete search history.

(56) References Cited

U.S. PATENT DOCUMENTS

| 6,118,744 A | 9/2000 | Sturgeon et al. |
| 6,597,405 B1 | 7/2003 | Iggulden |

(Continued)

FOREIGN PATENT DOCUMENTS

WO    2004003879    1/2004

OTHER PUBLICATIONS

Microsoft "Editing and Authoring Files," msdn.microsoft.com, Build date: Oct. 27, 2012, https://msdn.microsoft.com/en-us/library/windows/desktop/dd693072(v=vs.85).aspx.

(Continued)

*Primary Examiner* — Eileen Adams
(74) *Attorney, Agent, or Firm* — Akerman LLP; Michael K. Dixon; Mammen (Roy) P. Zachariah, Jr.

(57) ABSTRACT

A system for providing digital video recorder options for editing content is disclosed. In particular, the system may include receiving requests for a first version of media content and providing access to the first version of the media content. A user that accesses the first version of the media content may select a portion of the media content, and indicate whether, for example, the portion should be skipped, modified, or emphasized when the media content is accessed on a subsequent occasion. The system, based on the selection and indication, may edit the first version of the media content to create a second version of the media content. When a subsequent attempt is made to access the first version of the media content, the system may provide the user with the option to access the second version of the media content.

20 Claims, 7 Drawing Sheets

(51) Int. Cl.
*H04N 21/4147* (2011.01)
*H04N 21/4402* (2011.01)
*H04N 21/472* (2011.01)
*H04N 21/441* (2011.01)
*H04N 21/84* (2011.01)
*H04N 21/475* (2011.01)

(52) U.S. Cl.
CPC ..... *H04N 21/441* (2013.01); *H04N 21/44029* (2013.01); *H04N 21/4751* (2013.01); *H04N 21/47205* (2013.01); *H04N 21/8402* (2013.01)

(56) References Cited

U.S. PATENT DOCUMENTS

| | | |
|---|---|---|
| 6,774,926 B1 | 8/2004 | Ellis et al. |
| 7,380,258 B2 | 5/2008 | Durden et al. |
| 7,769,819 B2 | 8/2010 | Lerman et al. |
| 8,312,485 B2 | 11/2012 | Robson et al. |
| 8,761,585 B2 | 6/2014 | Barton et al. |
| 8,788,940 B2 | 7/2014 | Kotzin |
| 8,869,189 B2 | 10/2014 | Rudolph et al. |
| 2002/0147782 A1 | 10/2002 | Dimitrova et al. |
| 2003/0122966 A1 | 7/2003 | Markman et al. |
| 2004/0003413 A1 | 1/2004 | Boston et al. |
| 2004/0136549 A1* | 7/2004 | Pennock ............ G10H 1/02 381/119 |
| 2005/0028191 A1 | 2/2005 | Sullivan et al. |
| 2005/0188403 A1 | 8/2005 | Kotzin |
| 2005/0257242 A1 | 11/2005 | Montgomery et al. |
| 2006/0045479 A1 | 3/2006 | Hayashi |
| 2008/0172689 A1 | 7/2008 | Feder et al. |
| 2009/0052860 A1* | 2/2009 | Derrenberger ....... G11B 27/034 386/281 |
| 2009/0132947 A1 | 5/2009 | Seol |
| 2009/0222849 A1 | 9/2009 | Peters |
| 2009/0313546 A1* | 12/2009 | Katpelly ............ H04N 7/17318 715/723 |
| 2012/0054619 A1* | 3/2012 | Spooner ............... G11B 27/034 715/723 |
| 2012/0131475 A1 | 5/2012 | Bhogal et al. |
| 2014/0223468 A1 | 8/2014 | Katpelly et al. |
| 2014/0259046 A1 | 9/2014 | Ren et al. |
| 2015/0234564 A1* | 8/2015 | Snibbe ................. G06F 3/0488 715/716 |
| 2015/0318020 A1* | 11/2015 | Pribula ............ H04N 21/43615 386/227 |

OTHER PUBLICATIONS

Brown, "DVR-MS Editor: How to Edit DVRMS Files Fast and Easy," Wondersharem™, wondershare.com, Apr. 29, 2015, http://www.wondershare.com/videoeditingtips/editdvrmsvideos.html.

\* cited by examiner

DIGITAL VIDEO RECORDER OPTIONS FOR EDITING CONTENT

CROSS-REFERENCE TO RELATED APPLICATION(S)

This application is a continuation of and claims priority to U.S. patent application Ser. No. 14/810,890 filed on Jul. 28, 2015, the entirety of which is herein incorporated by reference.

FIELD OF THE INVENTION

The present application relates to technologies for digital video recorders, content editing technologies, and content distribution technologies, and more particularly, to a system and method for providing digital video recorder options for editing content.

BACKGROUND

In today's society, users are increasingly utilizing network and other service providers to gain access to the Internet, request and access various types of content, access software applications, access software services, and perform a variety of other tasks and functions. For example, an increasing number of users are subscribing to internet protocol television (IPTV) services provided by service providers in order to access various types of media content, such as, but not limited to, television shows, movies, and programs. Service providers typically provide such services over packet-switched networks as opposed to traditional terrestrial, satellite, or cable-based networks. Subscribers of such services often take advantage of digital video recorders or other similar media processing devices to record and store various types of media content delivered by their service providers. For example, if a particular program of interest is airing at a time that the subscriber cannot view in real time, the subscriber may set the digital video recorder to record the program of interest so that the subscriber can view the recorded program of interest at another time chosen by the subscriber.

While current digital video recording technologies provide a variety of features and functions that enhance users' experiences with media content, there is still room to substantially enhance and improve digital video recording technologies and content delivery technologies. For example, digital video recording technologies and content delivery technologies may be modified so as to provide enhanced quality-of-service for users, improved functionality, and additional options relating to the use of such technologies. Such enhancements and improvements to digital video recording technologies and content delivery technologies may provide for improved customer satisfaction and increased revenue for content and service providers.

SUMMARY

A system and accompanying methods for providing digital video recorder options for editing content are disclosed. In particular, the system and methods may involve utilizing a digital video recorder or other device to enable one or more users to edit media content for personal use. Additionally, the system and methods may involve providing one or more pre-edited versions of media content that have been pre-edited according to any number of criteria. In order to accomplish this, the system and methods may involve receiving a request for media content from a user, and providing access to the media content in response to the request. A user may access the requested media content and may utilize a controller, such as a television remote controller, to select a portion of the media content and indicate whether the selected portion should be skipped, modified, emphasized, or any combination thereof, when the media content is accessed on a subsequent occasion. Once the user selects the portion using the controller, a signal including the selection and indication may be transmitted to a digital video recorder or other similar device. The digital video recorder may include an editing application that may edit the media content based on the selection and indication provided by the user to create a second version of the media content. When a subsequent attempt is made to access the first version of the media content, the system and methods may include providing, such as via the digital video recorder, the user with the option to access the second version of the media content.

In addition to enabling users to indicate whether a selected portion of media content should be skipped, modified, or emphasized in a certain manner, the systems and methods may also include enabling users to categorize media content in a variety of ways. For example, the media content may be categorized by rating, by the type of media content, by preferences, by resolution, by popularity, or by any other categorization. Also, in certain embodiments, the service provider that delivers the media content may provide choices of multiple versions of the media content that have been pre-edited prior to the user making the selection and indication. For example, the service provider may provide multiple versions of media content according to criteria, such as, but not limited to, the rating of the media content, the resolution of the content, whether there is questionable language present in the media content, whether there is obscene material in the media content, whether there is violent material in the media content, or based on any other desired criteria. Thus, the systems and methods enable users to manually edit media content, receive previously edited media content, or a combination thereof.

In one embodiment, a system for providing digital video recorder options for editing content is disclosed. The system may include a memory that stores instructions and a processor that executes the instructions to perform various operations of the system. The system may perform an operation that includes receiving, from a controller, a first request to access a first version of media content. In response to the first request, the system may perform an operation that includes providing access to the first version of the media content and access to an editing application for editing the first version of the media content. The system may then perform an operation that includes receiving, from the controller and via the editing application, a first input indicating a start point for a portion of the first version of the media content and a second input indicating an end point for the portion of the first version of the media content. Based on the first and second inputs, the system may perform an operation that includes editing the first version of media content to create a second version of media content that does not include the portion of the first version of media content that is defined by the start point and the end point. The system may then perform an operation that includes receiving a second request to access the first version of media content. In response to the second request, the system may perform an operation that includes providing access to the second version of media content.

In another embodiment, a method for providing digital video recorder options for editing content is disclosed. The method may include utilizing a memory that stores instructions, and a processor that executes the instructions to perform the various functions of the method. The method may include receiving, from a controller, a first request to access a first version of media content. Additionally, the method may include providing, in response to the first request, access to the first version of media content and access to an editing application for editing the first version of media content. The method may also include receiving, from the controller and via the editing application, a first input indicating a start point for a portion of the first version of media content and a second input indicating an end point for the portion of the first version of media content. Once the inputs are received, the method may include editing, based on the first and second inputs, the first version of media content to create a second version of media content that does not include the portion of the first version of media content that may be defined by the start point and the end point. The method may then include receiving, from the controller, a second request to access the first version of media content. Furthermore, the method may include providing, in response to the second request, access to the second version of the media content.

According to yet another embodiment, a computer-readable device having instructions for providing digital video recorder options for editing content is provided. The computer instructions, which when loaded and executed by a processor, may cause the processor to perform operations including: receiving, from a controller, a first request to access a first version of media content; providing, in response to the first request, access to the first version of media content and access to an editing application for editing the first version of media content; receiving, from the controller and via the editing application, a first input indicating a start point for a portion of the first version of media content and a second input indicating an end point for the portion of the first version of media content; editing, based on the first and second inputs, the first version of media content to create a second version of media content that does not include the portion of the first version of media content that is defined by the start point and the end point; receiving, from the controller, a second request to access the first version of media content; and providing, in response to the second request, access to the second version of the media content.

These and other features of the systems and methods for providing digital video recorder options for editing content are described in the following detailed description, drawings, and appended claims.

DETAILED DESCRIPTION OF THE INVENTION

Figure 1:
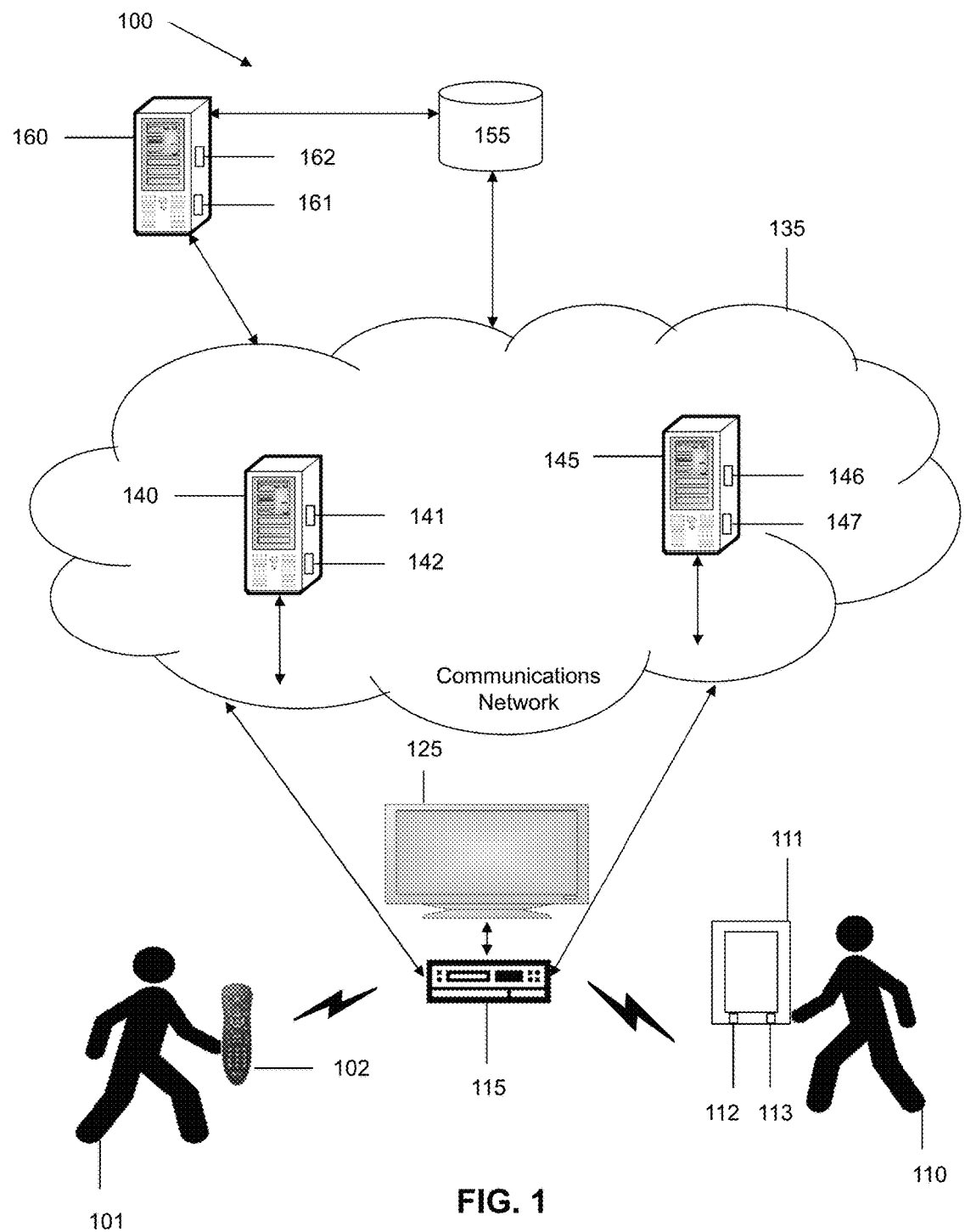
FIG. 1 is a schematic diagram of a system for providing digital video recorder options for editing content according to an embodiment of the present disclosure.

A system 100 and accompanying methods for providing digital video recorder options for editing content are disclosed, as shown in FIGS. 1-7. In particular, the system 100 and methods may involve utilizing a digital video recorder 115 or other device to enable one or more users 101, 110 to edit media content for personal use. Additionally, the system 100 and methods may involve providing one or more pre-edited versions of media content that have been pre-edited based on any number of criteria. In order to accomplish this, the system 100 and methods may involve receiving a request for media content from a user 101, and providing access to the media content in response to the request. A user 101 may access the requested media content and may utilize a controller 102, such as a television remote controller, to select a portion of the media content and indicate whether the selected portion should be skipped, modified, emphasized, or any combination thereof, when the media content is accessed on a subsequent occasion. Once the user 101 selects the portion using the controller 102, a signal including the selection and indication may be transmitted to a digital video recorder or other similar device. The digital video recorder 115 may include an editing application 119 that may be utilized to edit the media content based on the selection and indication provided by the user 101 to create a second version of the media content. When a subsequent attempt is made to access the first version of the media content, the system 100 and methods may include providing, such as via the digital video recorder 115, the user with the option to access the second version of the media content.

In addition to enabling users 101, 110 to indicate whether a selected portion of media content should be skipped, modified, or emphasized in a certain manner, the system 100 and methods may also include enabling users 101, 110 to categorize media content in a variety of ways. For example, the media content may be categorized by rating, by the type of media content, by user preferences, by resolution, by popularity, or by any other categorization. Also, in certain embodiments, the service provider that delivers the media content may provide choices of multiple versions of the media content that have been pre-edited. For example, the service provider may provide multiple versions of media content according to criteria, such as, but not limited to, the rating of the media content, the resolution of the content, whether there is questionable language present in the media content, whether there is obscene material in the media content, whether there is violent material in the media content, or based on any other desired criteria. Thus, the system 100 and methods enable users 101, 110 to manually edit media content, receive previously edited media content, or a combination thereof.

Figure 3:
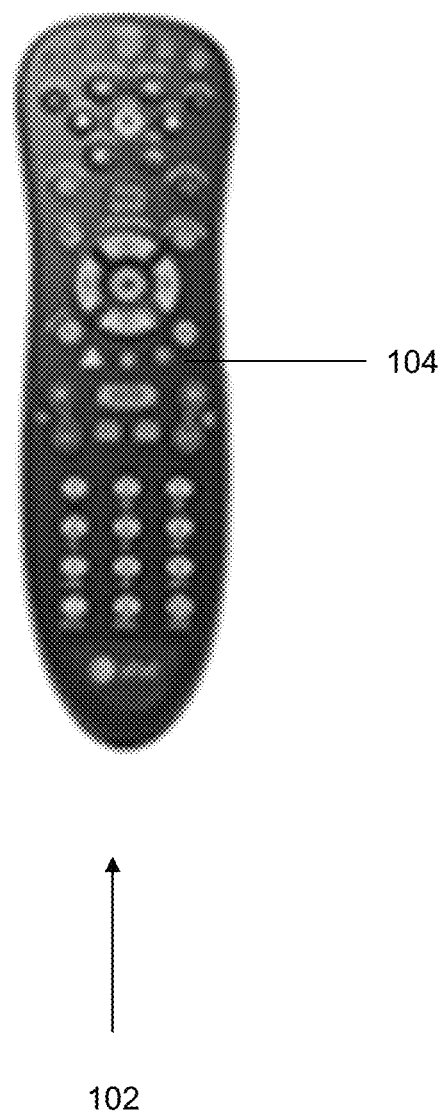
FIG. 3 is a close-up view of the controller utilizing for controlling the digital video recorder of FIG. 1.

As shown in FIG. 1, a system 100 for providing digital video recorder options for editing content is disclosed. The system 100 may be configured to support, but is not limited to supporting, IPTV services, digital video recorder services, cloud computing services, content delivery services, satellite services, telephone services, voice-over-internet protocol services (VoIP), software as a service (SaaS) applications, gaming applications and services, productivity applications and services, mobile applications and services, and any other computing applications and services. The system may include a first user 101 that may utilize a controller 102 to access content, data, and services, or to perform a variety of other functions. As an example, the first user 101 may utilize controller 102 to transmit signals to request various types of media content, edit media content, store media content on the digital video recorder 115, perform any functions associated with a remote controller for a television and/or digital video recorder 115, control the digital video recorder 115, control the media device 125, or any combination thereof. Media content may include, but is not limited to, audio content, video content, web content, text content, any type of content, or any combination thereof. As shown in FIG. 3, the controller 102 may include one or more input devices 104 that may be utilized to transmit the signals to request content, perform any functions of the controller 102, or both. In FIG. 1, the controller 102 is illustratively shown as a remote controller that may be utilized to control digital video recorder 115, media device 125, or a combination thereof. In certain embodiments, the controller 102 may be any type of controller, a smartphone, a mobile device, a smart watch, a computer, a personal computing device, any type of computing device that is capable of communicating with the digital video recorder 115, or any combination thereof. Additionally, the controller 102 may include any number of memories that store instructions and processors that execute the instructions to perform the operative functions performed by the controller 102. Furthermore, the controller 102 may communicate with the digital video recorder 115 by utilizing infrared radiation, Bluetooth connectivity, ZigBee, Z-Wave, any type of wireless protocol, radio technologies, or any combination thereof.

The system may also include a second user 110 that may utilize a mobile device 111 to also access content, data, and services, and to perform a variety of other functions. The mobile device 111 may be utilized to transmit signals to request various types of media content, edit media content, store media content on the digital video recorder 115, perform any functions associated with a remote controller for a television and/or digital video recorder 115, control the digital video recorder 115, control the media device 125, perform any computer functions, or any combination thereof. In certain embodiments, the mobile device 111 may have any number of software applications stored thereon. For example, the mobile device 111 may include a cloud-based application, gaming application, an internet-based application, a browser application, a mobile application, a productivity application, a video application, a music application, a streaming media application, a social media application, any other type of application, or a combination thereof. As an example, the mobile device 111 may include a media application that is configured to communicate with the digital video recorder 115, receive information and content from the digital video recorder 115, transmit signals to the digital video recorder 115, or any combination thereof. In certain embodiments, the software applications may include one or more graphical user interfaces so as to enable the second user 110 to readily interact with the software applications. In certain embodiments, at least a portion of the software application may be configured to execute directly on the mobile device 111, however, in other embodiments, the software application may be configured to execute on the other devices and components in the system 100. In FIG. 1, mobile device 111 is illustratively shown as a tablet computing device. However, in certain embodiments, the mobile device 111 may be a computer, a server, a smartphone, a phablet, a smart watch, or any other computing device. The mobile device 111 may include a memory 112 that stores instructions and a processor 113 that executes the instructions from the memory 112 to perform various operations that are performed by the mobile device 111. The processor 113 may be hardware, software, or a combination thereof.

The digital video recorder 115 of the system 100 may be a device that may be configured to record and store media content and information, access media content, perform any of the functionality of a traditional digital video recording device, or any combination thereof. The digital video recorder 115 may enable the first and second users 101, 110 to pause the playing of media content, rewind media content, fast-forward media content, or to perform other similar operations. In certain embodiments, the digital video recorder 115 may be included within a set-top box, connected to a set-top box, included within a gateway, connected to a gateway, included within a portable media player, connected to a portable media player, or any combination thereof. In certain embodiments, the digital video recorder 115 and the media device 125 may be housed together as a single device. The digital video recorder 115 may be controlled by the first user 101 by utilizing the controller 102. For example, the first user 101 may control the digital video recorder by utilizing any number of input devices 104 of the controller 102. Similarly, the second user 110 may control the digital video recorder 115 by utilizing the mobile device 111. For example, the second user 110 may control the digital video recorder 115 by utilizing a media application of the mobile device 111 that includes a user interface featuring controls for the digital video recorder 115. In certain embodiments, the service provider of the first and second users 101, 110 may control the digital video recorder 115.

Figure 2:
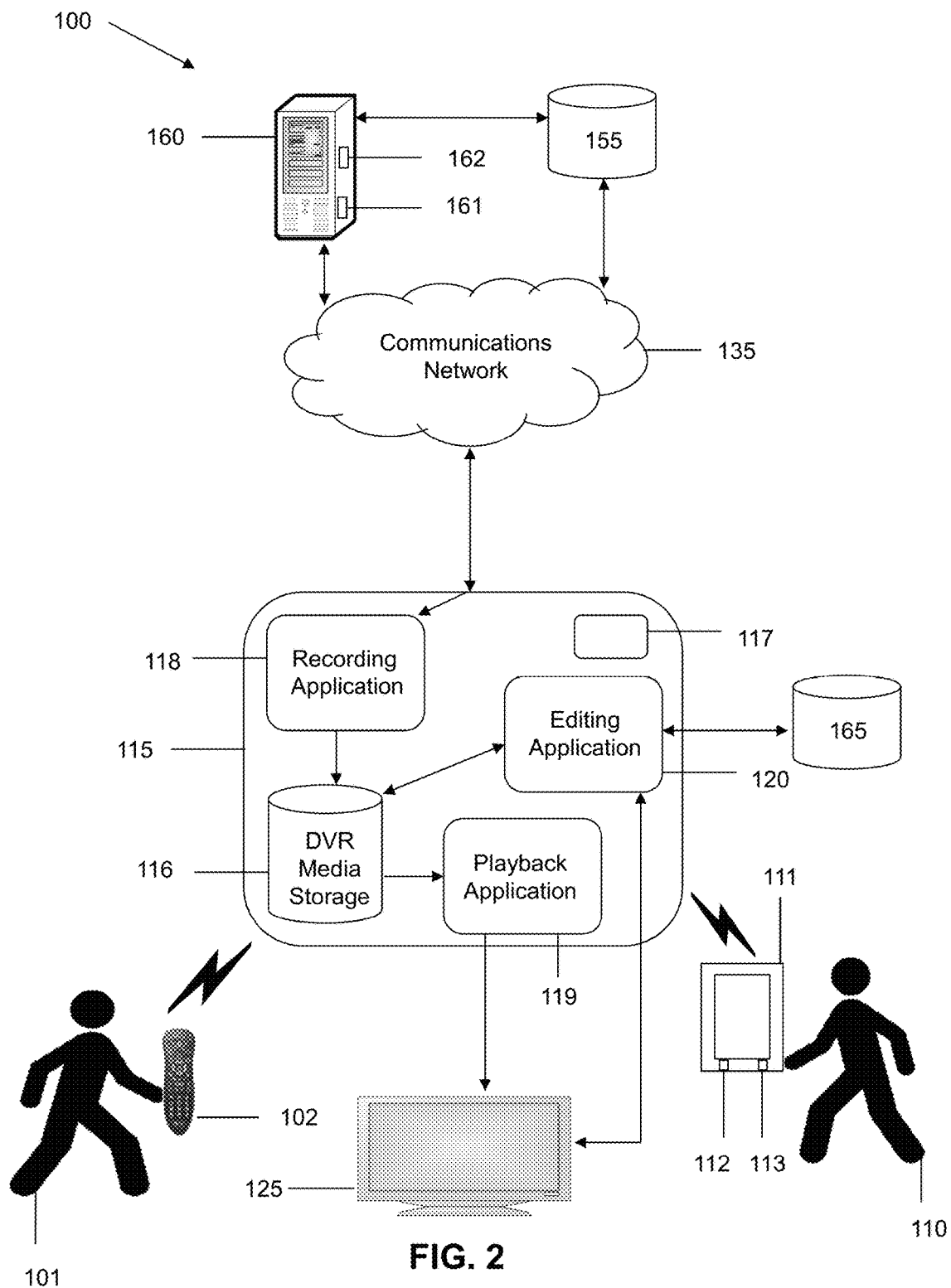
FIG. 2 is a schematic diagram illustrating further detail relating to various components and applications associated with the digital video recorder found in the system of FIG. 1.

The digital video recorder 115 may include a digital video recorder media storage 116 that may be configured to store media content and data. Additionally, the digital video recorder media storage 116 may be configured to store user preferences associated with the media content, information identifying the specific subscriptions that the first and second users 101, 110 have purchased, information identifying the types of services that may be provided to the first and second users 101, 110, any other information, or any combination thereof. Furthermore, the digital video recorder media storage 116 may be configured to store instructions that may be executed by a processor 117 of the digital video recorder 115 to perform various operations that are performed by the digital video recorder 115. The processor 117 may be hardware, software, or a combination thereof. As shown in FIG. 2, the digital video recorder may also include a recording application 118, which may be configured to record media content based on one or more inputs received from the controller 102, the mobile device 111, or a combination thereof. For example, the first user 101 may initiate the recording of media content by pressing on the input device 104 to transmit a signal that the recording of the media content should begin. In response to receiving the signal, the recording application 118 of the digital video recorder 115 may begin recording the media content for storage on the digital video recorder media storage 116. The recording application 118 may stop recording the media content based on receiving another input from the controller 102, the mobile device 111, or both.

In addition to the recording application 118, the digital video recorder 115 may include a playback application 119, which may be utilized to play media content stored on the digital video recorder 115. For example, based on receiving an input to play media content from the controller 102, the mobile device 111, or both, the playback application 119 may access media content stored on the digital video recorder media storage 116 that corresponds to the input received. Once the requested media content is accessed, the playback application 119 may cause the media content to be played on a display device, such as on the media device 125. In certain embodiments, the playback application 119 may be configured to directly access requested media content from the recording application 118.

The digital video recorder 115 may also include an editing application 120, which may be utilized by the first and second users 101, 110 to edit media content. For example, the editing application 120 may be utilized to perform various types of editing functions, which include, but are not limited to, removing or skipping certain portions of media content, marking or tagging certain portions of media content, rating the media content, pixelating portions of the media content, setting alerts for certain portions of the media content, compressing portions of the media content, adding text or commentary to the media content, including pointers on portions of the media content, overdubbing portions of audio and/or video content in the media content, inserting alternative media content into the media content, inserting webcam content into a portion of the media content, categorizing portions of the media content into selected categories, altering the media content in any way, or any combination thereof. As an example, if the first user 101 wanted to remove a certain scene from a particular movie file stored on the digital video recorder 115, the first user 101 may utilize the controller 102 to transmit a signal to the editing application 120 to delete the certain scene and to replace the deleted scene with different media content selected by the first user 101. The different media content, for example, may be obtained from the database 165 and spliced into the media content by the editing application 120 at the location where the deleted scene was located.

The editing application 120 may be configured to receive input signals from the controller 102, the mobile device 111, or both, which indicate what type of edits the first and second users 101, 110 would like to have performed on selected media content. The editing application 120 may be configured to edit media content stored on the digital video recorder media storage 116, media content recorded by the recording application 118, media content received from the communications network 135, media content stored in databases 155, 165, or any other media content. In certain embodiments, a service provider of the first and second users 101, 110 may transmit signals that indicate how media content should be edited, which portions of media content may be edited, whether media content may be edited, or any combination thereof. Media content that is edited by the editing application 120 may be sent back to the digital video recorder media storage 116 for storage, to the playback application 119 for playing, to the database 165, to the database 155, or any combination thereof. In certain embodiments, the editing application 120 may include playback functionality and may cause the edited media content to be played on the media device 125 for the first and second users 101, 110 to experience. The recording application 118, the playback application 119, and the editing application 120 may be software programs that may be configured to execute on the digital video recorder 115 or may be otherwise accessible by the digital video recorder 115 from a separate device.

The media device 125 of the system 100 may be a monitor, a television, a tablet device, a computer, or any other type of device including a display that is capable of displaying media content. In certain embodiments, the media device 125 may be controlled by utilizing the controller 102, by utilizing the mobile device 111, by utilizing controls on the media device 125 itself, or by utilizing the service provider associated with the first and second users 101, 110. The media device 125 may be configured to communicate with the playback application 119, the editing application 120, the digital video recorder media storage 116, the digital video recorder 115, or any combination thereof. In certain embodiments, the media device 125 may include any number of memories configured to store instructions and processors configured to execute the instructions to perform various operations performed by the media device 125. The media device 125 may be configured to display or otherwise output media content provided by the digital video recorder 115 or by any other device in the system 100.

In certain embodiments, the controller 102, the mobile device 111, and the digital video recorder 115 may have corresponding device profiles. In certain embodiments, each of the devices in the system 100 may have its own corresponding device profile. For example, the media device 125 may have its own device profile. Information included in a device profile may include, but is not limited to, information specifically corresponding to the controller 102, the mobile device 111, and the digital video recorder 115, information identifying the types of devices that the controller 102, mobile device 111, and digital video recorder 115 are, information relating to how the first user 101 utilizes the controller 102, information relating to how the second user 110 utilizes the mobile device 111, information identifying what type of services and information the first user 101 and second user 110 are authorized to access, information indicating each type of component included in the controller 102, the mobile device 111, and the digital video recorder 115, information identifying the processing power, storage capacity, download capabilities, upload capabilities, and content delivery services subscriptions associated with the mobile device 111 and/or digital video recorder 115, any other information associated with the controller 102, the mobile device 111, and/or digital video recorder 115, or any combination thereof. The device profiles may be made accessible to any device, network, or a combination thereof, in the system 100.

In addition to device profiles, the system 100 may also include user profiles. A user profile may be a profile corresponding to the first user 101, the second user 110, or any other user. For example, the first user's 101 profile may include information, such as, but not limited to, a name of the first user 101, the age of the first user 101, demographic information associated with the first user 101, information identifying the controller 102 of the first user 101, the types of services, such as content delivery services, subscribed to by the first user 101, information identifying a location of the first user 101, information identifying the type of content the first user 101 likes, information identifying the types of applications that the first user 101 utilizes, information identifying media content edited by the first user 101, and any other information. The user profiles may be stored directly on the digital video recorder 115 and/or mobile device 111, the database 155, the database 165, on any other device in the system 100, or on any combination thereof. Additionally, the user profiles may be accessible by any device in the system 100, any network in the system 100, or a combination thereof.

The communications network 135 of the system 100 may be configured to link each of the devices in the system 100 to one another, and be configured to transmit, generate, and receive any information and data traversing the system 100. In one embodiment, the communications network 135 may include any number servers, databases, or other componentry. The communications network 135 may be configured to communicatively link with the controller 102, the mobile device 111, the digital video recorder 115, the media device 125, the server 140, the server 145, the database 155, the server 160, the database 165, or any combination thereof. The communications network 135 may also include and be connected to an IPTV network, a cloud-computing network, a wireless network, an ethernet network, a satellite network, a broadband network, a cellular network, a private network, a cable network, the Internet, an internet protocol network, a multiprotocol label switching (MPLS) network, a content distribution network, or any combination thereof. For example, the communications network 135 may be an internet protocol television network that may be configured to deliver media content and services using an internet protocol suite and by utilizing packet switching. The communications network 135 may provide the ability to stream media requested by the first and second users 101, 110, provide live television services, provide time-shifted media, provide for media-on-demand, or any combination thereof. In certain embodiments, the communications network 135 may include any of the components and functionality found in traditional internet protocol television networks. In one embodiment, the communications network 135 may be part of a single autonomous system that is located in a particular geographic region, or be part of multiple autonomous systems that span several geographic regions.

Notably, the functionality of the system 100 may be supported and executed by using any combination of the servers 140, 145, and 160. In certain embodiments, the server 140 may include a memory 141 that includes instructions, and a processor 142 that executes the instructions from the memory 141 to perform various operations that are performed by the server 140. The processor 142 may be hardware, software, or a combination thereof. Similarly, the server 145 may include a memory 146 that includes instructions, and a processor 147 that executes the instructions from the memory 146 to perform the various operations that are performed by the server 145. In certain embodiments, the servers 140, 145, and 160 may be network servers, routers, gateways, computers, mobile devices or any other suitable computing device. In certain embodiments, the servers 140, 145 may be communicatively linked to the communications network 135, any network, any device in the system 100, or any combination thereof.

The database 155 of the system 100 may be utilized to store and relay information that traverses the system 100, cache content that traverses the system 100, store data about each of the devices in the system 100 and perform any other typical functions of a database. In certain embodiments, the database 155 may be connected to or reside within the communications network 135, any other network, or a combination thereof. Additionally, the database 155, in certain embodiments, may serve as a content source for stored content that may be accessed by the communication network 135 so that the communication network 135 may obtain content for the first and second users 101, 110 in an efficient and effective manner. In certain embodiments, the database 155 may serve as a central repository for content and information requested by the first and second users 101, 110 and/or content edited by the first and second users 101, 110. Furthermore, the database 155 may include a processor and memory or be connected to a processor and memory to perform the various operation associated with the database 155. In certain embodiments, the database 155 may be connected to servers 140, 145, 160, controller 102, mobile device 111, digital video recorder 115, media device 125, or any combination thereof. The database 155 may also store information and metadata obtained from the system 100, store metadata and other information associated with the first and second users 101, 110, store user profiles associated with the first and second users 101, 110, store device profiles associated with the controller 102, mobile device 111, digital video recorder 115, and media device 125, store location information, store communications traversing the system 100, store user preferences, store information associated with any device or signal in the system 100, store information relating to patterns of usage relating to the controller 102 and mobile device 111, store any information traversing the system 100, or any combination thereof. Furthermore, the database 155 may be configured to process queries sent to it by any device in the system 100.

In addition including database 155, the system 100 may also include a database 165. The database 165 may be a data storage device that is local to the first user 101, second user 110, or both. In certain embodiments, the database 165 may be connected to or reside within a local network associated with the first user 101, the second user 110, or both. In certain embodiments, the database 165 may be connected to or reside within the communications network 135, any other network, or a combination thereof. Additionally the database 165 may be communicatively linked to the digital video recorder 115 and may be configured to store any information associated with the digital video recorder 115. In certain embodiments, database 165 may be configured to store personal content that the first and second users 101, 110 own, create, license, or are otherwise authorized to access. For example, the database 165 may be configured to store audio content, video content, web content, text content, edited content, any type of content, or any combination thereof. Furthermore, the database 165 may include a processor and memory or be connected to a processor and memory to perform the various operation associated with the database 165. In certain embodiments, the database 165 may be configured to store any of the information that the database 155 is configured to store.

Figure 4:
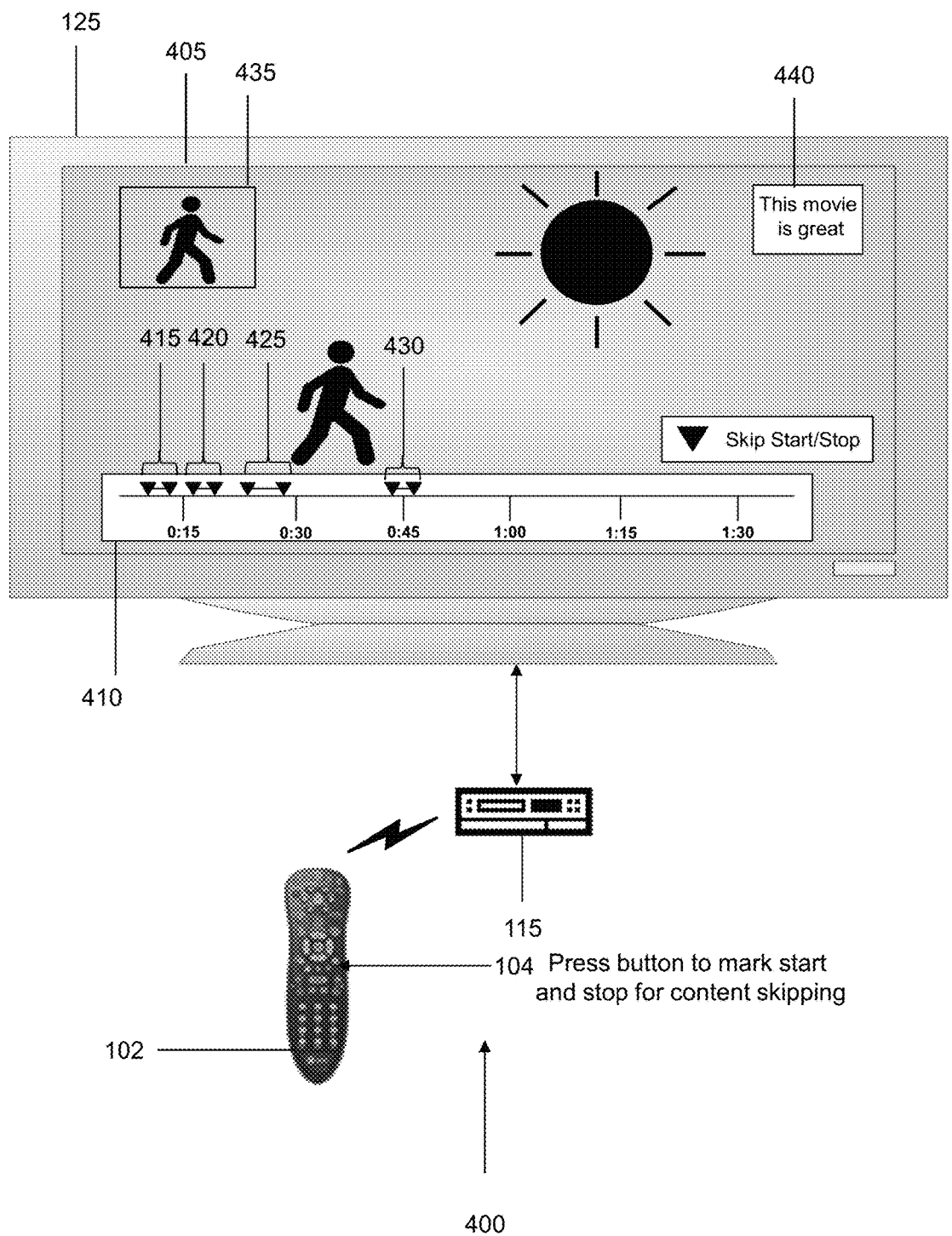
FIG. 4 provides an example scenario in which a user is editing content according to an embodiment of the present disclosure.

Operatively, the system 100 may provide digital video recorder options for editing content. In a first example scenario, the first user 101 may be a parent and the second user 110 may be a child of the parent, and the parent and child may each want to watch a particular movie. Since many parents often find themselves concerned about their children viewing movies based on questionable scenes in such movies, the parent may want to be able to edit a first version of the movie file associated with the movie so that the child may watch an edited version of the movie file that does not include the questionable scenes. The system 100 may enable the parent to manually edit media content or even access previously edited versions of the media content that may be supplied by a service or content provider. Referring now also to FIG. 4, the parent may utilize the input device 104 of the controller 102 to transmit a signal to request access to a movie file stored on the digital video recorder 115. Upon receiving the signal from the controller 102, the digital video recorder may retrieve the movie file from the digital video recorder media storage 116 and provide the movie file to the media device 125 for display. The media device 125 may display a user interface that includes a timeline 410 for the movie. The parent may watch the movie file and as the parent is watching the movie, the parent may utilize the input device 104 of the controller 102 to mark or tag a start point of a scene 415 in the movie and also mark or tag an end point of the scene 415 in the movie. The parent may mark or tag the start point by pressing on the input device 104 and may mark or tag the end point by pressing on the input device 104 again. The parent may continue to mark start and end points for additional scenes 420, 425, and 430 as the parent watches the movie. If a particular scene has already progressed beyond the point at which the parent would like to mark as the start point, the parent may be provided with the option to rewind the movie to the desired start point so that the parent may mark or tag the start point of the scene. Similarly, the parent may be provided with the option to fast-forward the movie to a desired end point so that the parent may mark or tag the desired end point of the scene.

The portions of the movie file defined by or in between the start and end points marked by the parent may be edited as the parent sees fit so that upon a subsequent viewing of the movie, the edited version of the movie is provided as an option for viewing. For example, the parent may deem that the scene 415 has gratuitous violence, and that scene 415 should be removed from the movie. The parent may utilize the controller 102 to transmit a signal to the digital video recorder 115 that the scene 415 should be removed from the movie. The editing application 120 may be utilized to remove the scene 415 from the movie. With regard to scene 420, the actual video content of scene 420 may be fine for the child to watch, however, the audio content may include foul language. The parent may utilize the controller 102 to transmit a signal to the digital video recorder 115 that causes the editing application 120 to overdub alternative audio content over the original audio content that occurs during scene 420. With regard to scene 425, the video content of the scene 425 may include sexual content. The parent may utilize the controller 102 to transmit a signal to the digital video recorder 115 that causes the editing application 120 to pixelate scene 425 so that upon a subsequent viewing of the movie, scene 425 is pixelated.

With regard to scene 430, the parent may decide that the parent wants his or her own personal video content to be inserted in place of the original scene 430 of the movie. In order to do so, the parent may utilize the controller 102 to transmit a signal to the digital video recorder 115 to obtain the personal video content, such as from database 165, so that the editing application 120 may insert the personal video content into the place of original scene 430. The parent may also decide to insert real-time or other types of media content into the movie. For example, the parent may utilize the controller 102 to transmit a signal to a webcam or other video camera device to record video of the parent and any speech made by the parent. The video may include the parent's reactions and audio commentary of the movie and may be inserted into the movie as picture-in-picture content 435. The picture-in-picture content 435 may be played during the movie so as to show the parent's reactions and verbal commentary on the movie as the movie is being watched in real-time or when the movie is watched on a subsequent occasion. The parent may also utilize the controller 102 to cause text content 440 to be inserted into the movie. For example, the text content 440 "This movie is great" is shown in FIG. 4 as being displayed in the movie. The text content 440 may be typed in by the parent by utilizing the controller 102, by utilizing a graphical user interface displayed on the media device 125, or by converting the parent's captured audio speech into text.

The parent may also utilize the controller 102 to add visual or audio alerts, notifications, warnings, or any combination thereof, at certain locations in the media content. For example, the controller 102 may be utilized to transmit a signal to the digital video recorder 115 that indicates that a visual alert, such as a flashing red circle or other visual alert, should be shown that indicates that a violent scene is about to begin if scene 415 is about to be played. The warning may begin at the start point and end at the end point. Similarly, an audio alert that includes a unique noise or a pre-recorded voice that indicates that the violent scene is about to start may also be played. The controller 102 may also be utilized to compress the media content into different formats, resolutions, and sizes. The controller 102 may further be utilized to remove redundant frames occurring in the media content so as to shorten the length of the media content in the movie. Furthermore, pointers may also be placed at desired locations in the media content as well. The parent may ultimately make any type of edit to the media content utilizing the controller 102 and the digital video recorder 115.

Once the parent has made all of his or her editing preferences with regard to the movie, the editing application 120 may perform all of the requested edits and replace the original movie file stored on the digital video recorder media storage 116 with the edited version of the movie file or create a second version of the movie file to be stored on the digital video recorder media storage 116. If, for example, the child sends a request for the movie by utilizing the mobile device 111, the digital video recorder 115 may present the edited version of the movie as an option to watch in place of the original version of the movie. As an alternative, the digital video recorder 115 may show two options to the child for viewing: the original version of the movie and the edited version of the movie. The parent may indicate, by utilizing the controller 102, which versions of the movie that the child can access.

Figure 5:
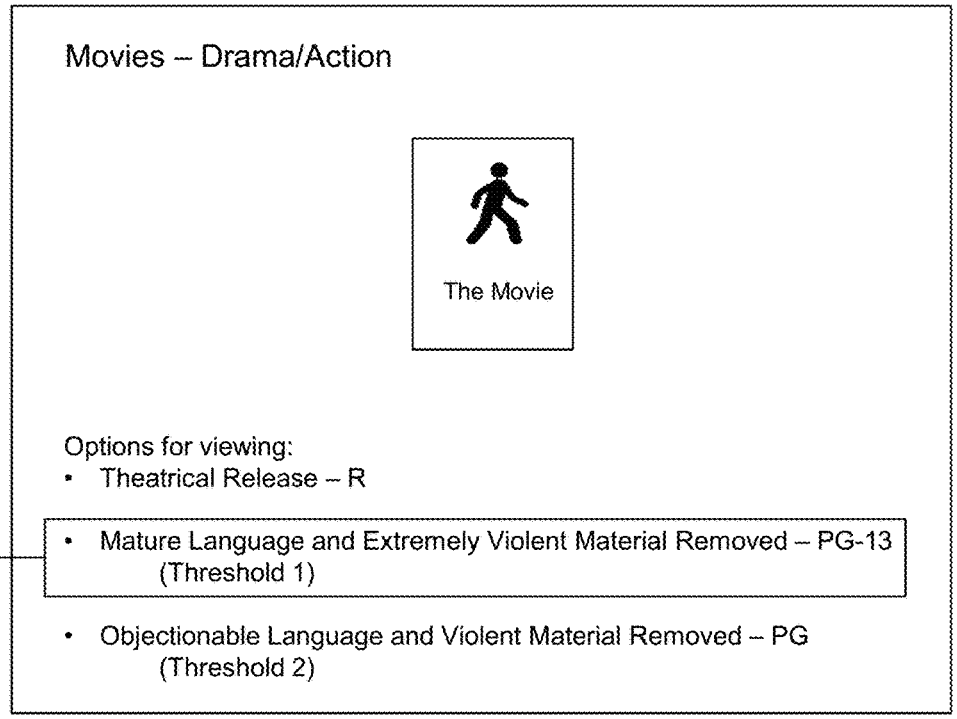
FIG. 5 provides an example scenario where the service provider may provide pre-edited version of media content according to an embodiment of the present disclosure.

In another example scenario as shown in FIG. 5, the first and second users 101, 110 may be provided with pre-edited versions of media content according to an embodiment of the present disclosure. The pre-edited versions of media content may be generated and provided by a service provider, content provider, or even the first and second users 101, 110. FIG. 5 illustrates an interface 500, which illustrates three different version of a movie, a R-rate version of the movie, a PG-13 version 505 of the movie, and a PG version of the movie. The second user 110 may select the PG-13 version 505 of the movie for viewing by using the mobile device 111. The parent may set, such as by utilizing the controller 102, which version of the movie may be made accessible to other users in the system 100.

In certain embodiments, the digital video recorder 115 may be configured to auto-select which of the pre-edited versions of the media content should be played based on which user is attempting to access the media content. For example, if the first user 101 is a parent and the second user 110 is a child and each of them are interested in watching the same movie, the digital video recorder 115 may detect which of them is requesting to access to the movie. If the child is requesting to access the movie, the digital video recorder 115 may automatically select, for example, a G-rated version of the movie to display on the media device 125. A notification may be displayed on the media device 125 that indicates which version of the media content is playing. However, if the parent is requesting to access the movie, the digital video recorder 115 may automatically select, for example, a PG-13 version of the movie to display on the media device 125. A notification may be displayed on the media device 125 that indicates that the PG-13 version of the movie is now playing. If the parent stops watching the movie while the PG-13 version of the movie is playing and the child comes in and tries to watch the movie, the digital video recorder 115 may automatically switch the movie to the G-rated version of the movie and provide a notification that the G-rated version is now being played. In some embodiments, instead of automatically switching between versions of media content, the digital video recorder 115 may cause a prompt to be displayed on the media device 125 that provides the parent and/or child with the option to select the appropriate version of the media content. Notably, the digital video recorder 115 may not be limited to selecting from pre-edited versions of the media content, but may also be configured to select media content from user-edited versions of the media content as well.

The digital video recorder 115 may be configured to detect who is attempting to access media content based on which user account is logged into the system 100 and/or which user account is currently attempting to access the media content. For example, the child may have his or her own account that includes information that identifies the child and identifies the types and ratings of media content that the child is authorized to access. Similarly, the parent may have his or her own account that identifies the parent and identifies the types and ratings of media content that the parent is authorized to access. In certain embodiments, the detection of who is attempting to access media content may be performed by capturing and analyzing video of the individual that is utilizing the controller 102 and/or mobile device 111 to access the media content. In certain embodiments, other available methods for tracking and identifying which users are attempting to access or watch media content may be utilized as well.

Notably, as shown in FIG. 1, the system 100 may perform any of the operative functions disclosed herein by utilizing the processing capabilities of server 160, the storage capacity of the database 155, or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, receiving requests to access content, providing access to the content, providing access to the editing application or other applications of the digital video recorder device 115, receiving inputs to edit the content, editing the content, providing access to the editing content, providing access to pre-edited version of content, and performing any other suitable operations conducted in the system 100 or otherwise. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100.

Although FIG. 1 illustrates a specific example configuration of the various components of the system 100, the system 100 may include any configuration of the components, which may include using a greater or lesser number of the components. For example, the system 100 is illustratively shown as including a controller 102, a mobile device 111, a digital video recorder 115, a media device 125, a communications network 135, a server 140, a server 145, a server 160, a database 155, and a database 165. However, the system 100 may include multiple controllers 102, multiple mobile devices 111, multiple digital video recorders 115, multiple media devices 125, multiple communications networks 135, multiple servers 140, multiple servers 145, multiple servers 160, multiple databases 155, multiple databases 165, or any number of any of the other components in the system 100. Furthermore, in certain embodiments, substantial portions of the functionality and operations of the system 100 may be performed by other networks and systems that may be connected to system 100.

Figure 6:
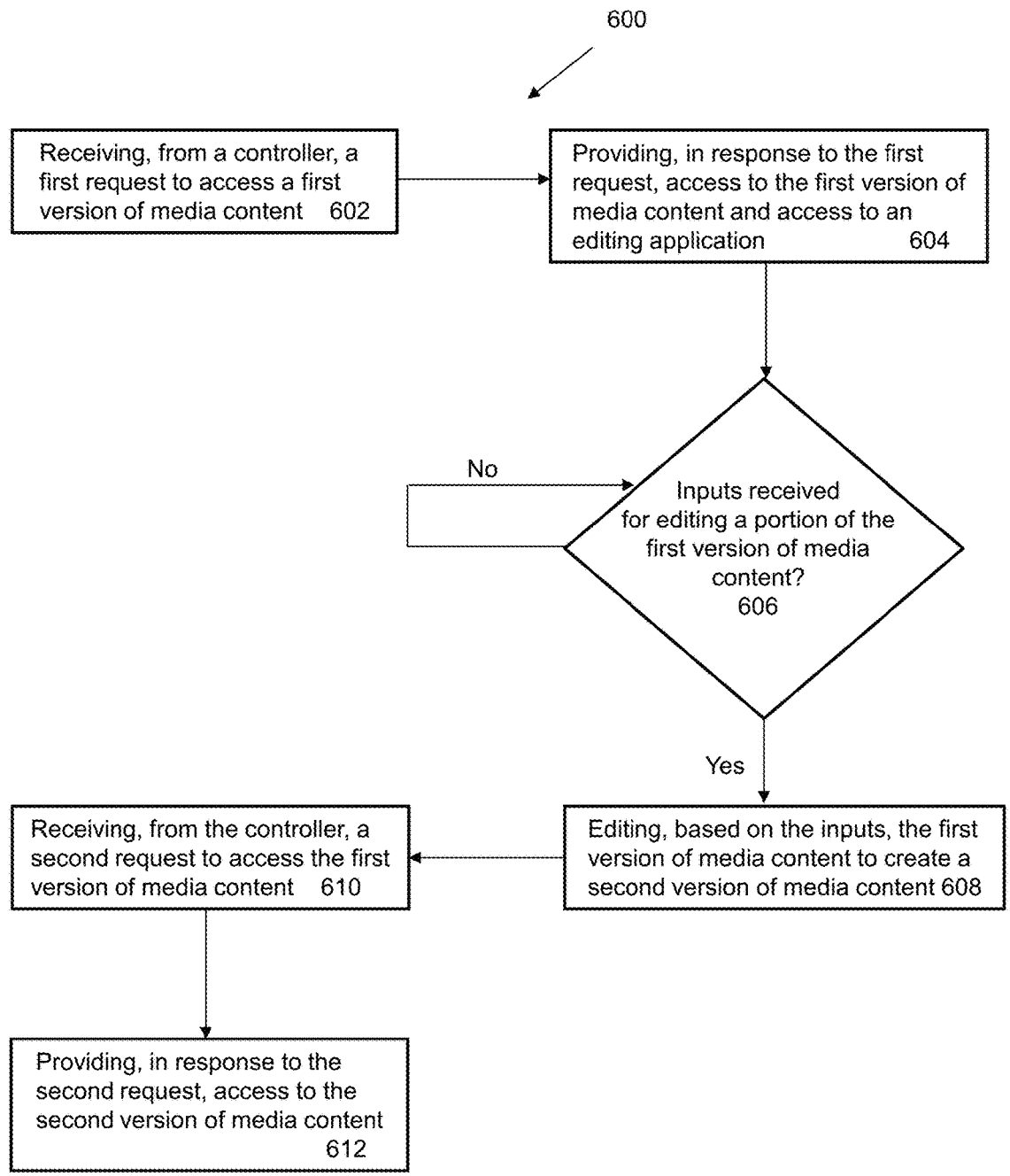
FIG. 6 is a flow diagram illustrating a sample method for providing digital video recorder options for editing content according to an embodiment of the present disclosure.

As shown in FIG. 6, an exemplary method 600 for providing digital video recorder options for editing content is schematically illustrated, and may include, at step 602, receiving a first request from a user to access a first version of media content. In certain embodiments, the request may be a request for a service, data, information, any other type of request, or any combination thereof. In certain embodiments, the first request may be transmitted by the controller 102, the mobile device 111, any combination thereof, or by any other appropriate device. In certain embodiments, the first request may be received by the digital video recorder 115, any application of the digital video recorder 115, or by any other appropriate device. At step 604, the method 600 may include providing, in response to the first request, access to the first version of the media content. Additionally, access to the editing application 120 may also be provided. In certain embodiments, the access may be granted by the digital video recorder 115, the media device 125, or by any other appropriate device. In certain embodiments the access maybe granted to the first user 101, the second user 110, the mobile device 111, the controller 102, or to any other appropriate device.

At step 606, the method 600 may include determining if one or more inputs have been received for editing a portion of the first version of the media content. In certain embodiments, the one or more inputs may be received by the digital video recorder 115, the media device 125, any applications accessible by the digital video recorder 115, or by any other appropriate device. The inputs may be provided by utilizing the controller 102, the mobile device 111, or by utilizing any other appropriate device. For example, the first and second users 101, 110 may utilize the controller 102 and mobile device 111 respectively to make the inputs. An input may include, but is not limited to, an input for indicating a start point for a portion of the first version of the media content, an input for indicating an end point for the portion of the first version of the media content, an input for indicating whether the portion of the first version of the media content should be removed or skipped, an input indicating the marking or tagging of certain portions of the first version of the media content, an input indicating a rating for the media content, an input indicating that certain portions of the media content are to be pixelated, an input indicating one or more alerts should be outputted when certain portions of the media content are played, an input indicating that certain portions of the media content should be compressed into a different format or a lower resolution, an input indicating that text or commentary is to be inserted into the media content for output, an input indicating that pointers should be inserted into portions of the media content, an input indicating that portions of audio and/or video content in the media content are to be overdubbed, an input indicating that alternative media content is to be inserted into the media content, an input indicating that webcam content is to be inserted into a portion of the media content, an input indicating that portions of the media content are to be categorized into selected categories, an input indicating that the media content is to be altered in any way, or any combination thereof.

If the one or more inputs for editing a portion of the first version of the media content have not been received, the method 600 may include continuing with step 606 until one or more inputs are received. If, however, one or more inputs are received for editing a portion of the first version of the media content, the method 600 may include editing, based on the one or more inputs, the first version of the media content to create a second version of the media content. In certain embodiments, the editing of the media content may be performed by utilizing the digital video recorder 115, the editing application 120, or by utilizing any other appropriate device. At step 610, the method 600 may include receiving a second request to access the first version of the media content. In certain embodiments, the second request may be received from the controller 102, the mobile device 111, or by any other appropriate device. At step 612, the method 600 may include providing, in response to the second request, access to the second version of the media content that was created based on the inputs. In certain embodiments, the access may be provided by the digital video recorder 115, any application accessible by the digital video recorder 115, or by any other appropriate device. Notably, the method 600 may incorporate any of the functionality and features as described for the system 100 or as otherwise described herein.

Notably, the system 100 and methods disclosed herein may include additional functionality and features. For example, in certain embodiments, the system 100 and methods may include enabling a service provider associated with the first and second users 101, 110 to provide choices of multiple versions of media content that have been pre-edited based on a variety of criteria. In certain embodiments, the service provider may provide multiple versions of media content according to criteria, such as, but not limited to, the rating of the media content, the resolution of the content, whether there is questionable language present in the media content, whether there is obscene material in the media content, whether there is violent material in the media content, or based on any other desired criteria. For example, the service provider may provide pre-edited versions of a movie, such as a G-rated version of the movie, a PG-rated version of the movie, a R-rated version of the movie, and the like. As another example, the service provider may provide different resolutions of the movie, such as a 720p version of the movie, a 1080p version of the movie, a 4 k version of the movie, and the like.

The service provider may also pre-cut or divide media content into multiple portions and transmit each of the portions to the digital video recorder 115 for storage. The first and second users 101, 110 may access the media content and may pick and choose which portions they want to view together. For example, if the service provider pre-cut a movie file into twenty different portions and two of those portions contain questionable language or gratuitous violence, the first and/or second user 101, 110 can select the eighteen portions of the movie for display and prevent the remaining two portions from being displayed. In certain embodiments, the service provider may also categorize an entire media content file or even categorize individual portions of the media content file. For example, a media content file may be categorized by rating, by the type of language used in the media file, by whether there is sexual content, by whether there is violence, by whether there is obscene imagery, or by any other categorization. If the media content file is pre-cut into multiple portions, each of the portions may also be categorized as well. In certain embodiments, the first and second users 101, 110 may be allowed to categorize the media content themselves as well.

The system 100 and methods may also include enabling edited media content or any other media content to be electronically pushed to a social media application so that other users may access the edited media content or other content. The digital video recorder 115 may push the edited media content or other content to a server hosting the social media application and to a user account of a user for upload onto a user's social media page. The media content may also be pushed to any application of choice, including gaming applications, productivity applications, business applications, community forums and message boards, or to any other type of application. Additionally, the media content may be saved to an account, such as to cloud-based accounts of the first and second users 101, 110.

In addition to pressing the input device 104 a first time to mark a start point of a scene and pressing the input device 104 a second time to mark an end point of a scene, the system 100 and methods may also allow the first and second users 101, 110 to mark the start and end points in other ways. For example, the first user 101 may press the input device 104 to mark the start point and continue to keep the input device 104 pressed down. A visual cursor may be displayed on the user interface shown on the media device 125 and the user may drag the visual cursor across the timeline to the end point of the scene. The first user 101, for example, may release the input device 104 to mark the end of the scene. Similarly, the second user 110 may user his or her finger to mark the start and end points on a touchscreen interface of the mobile device 111, which may simultaneously display the content being displayed at the media device 125. Furthermore, the first and second users 101, 110 may utilize the controller 102 and mobile device 111 to cut up media content on their own into different portions, which may be categorized by each of the first and second users 101, 110. Moreover, the media content is not intended to be limited to stored media content, and may include, for example, live television content, real-time content, pay-per-view content, or any other type of content.

Figure 7:
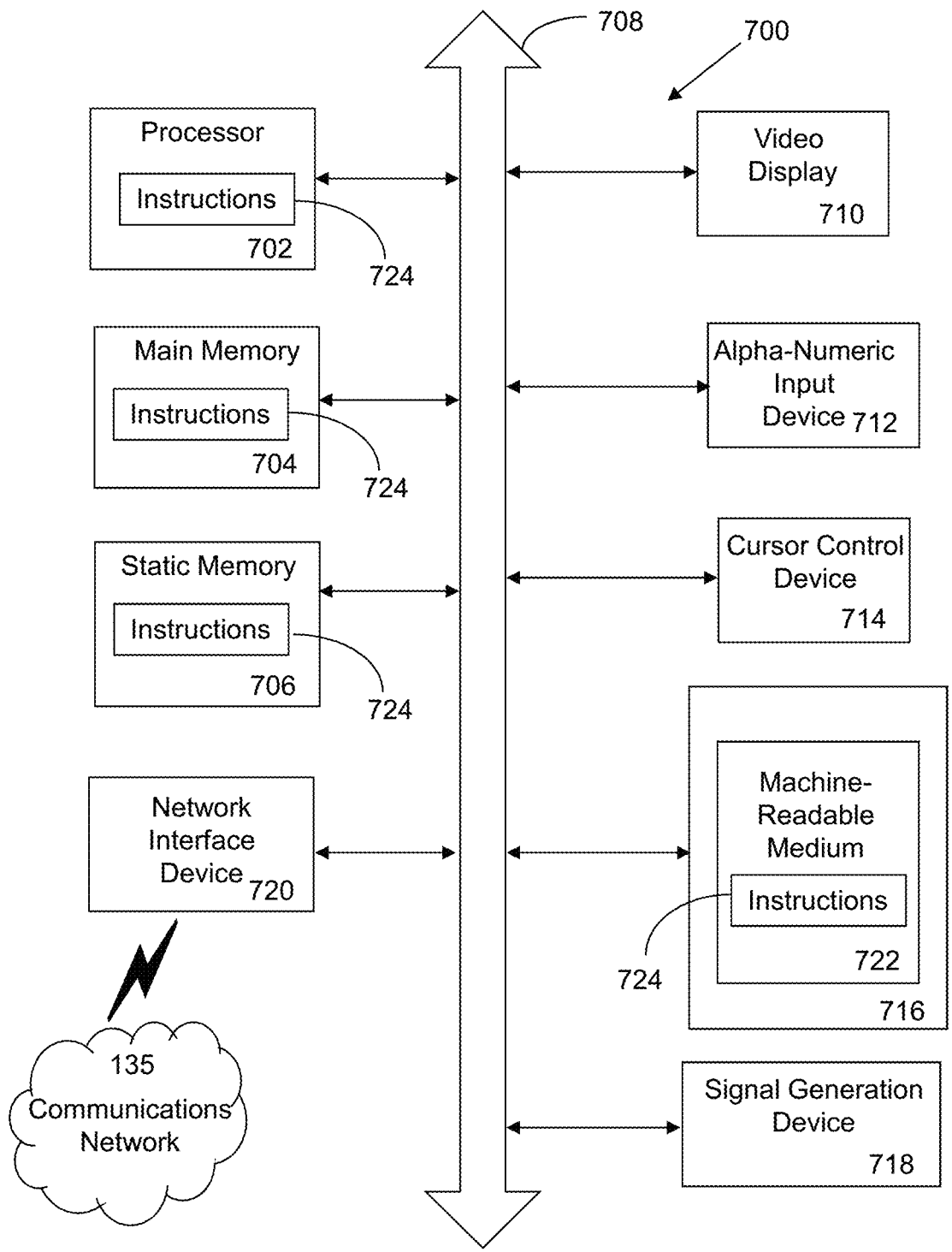
FIG. 7 is a schematic diagram of a machine in the form of a computer system within which a set of instructions, when executed, may cause the machine to perform any one or more of the methodologies or operations of the systems and methods for providing digital video recorder options for editing content.

Referring now also to FIG. 7, at least a portion of the methodologies and techniques described with respect to the exemplary embodiments of the system 100 can incorporate a machine, such as, but not limited to, computer system 700, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using communications network 135, another network, or a combination thereof) to and assist with operations performed by other machines and systems, such as, but not limited to, the controller 102, the mobile device 111, the digital video recorder 115, the media device 125, the server 140, the server 145, the database 155, the server 160, the database 165, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710, which may be, but is not limited to, a liquid crystal display (LCD), a flat panel, a solid state display, or a cathode ray tube (CRT). The computer system 700 may include an input device 712, such as, but not limited to, a keyboard, a cursor control device 714, such as, but not limited to, a mouse, a disk drive unit 716, a signal generation device 718, such as, but not limited to, a speaker or remote control, and a network interface device 720.

The disk drive unit 716 may include a machine-readable medium 722 on which is stored one or more sets of instructions 724, such as, but not limited to, software embodying any one or more of the methodologies or functions described herein, including those methods illustrated above. The instructions 724 may also reside, completely or at least partially, within the main memory 704, the static memory 706, or within the processor 702, or a combination thereof, during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 722 containing instructions 724 so that a device connected to the communications network 135, another network, or a combination thereof, can send or receive voice, video or data, and to communicate over the communications network 135, another network, or a combination thereof, using the instructions. The instructions 724 may further be transmitted or received over the communications network 135, another network, or a combination thereof, via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device, or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. A system, comprising:
   a memory that stores instructions; and
   a processor that execute the instructions to perform operations, the operations comprising:
   detecting a first identity of a first user that sent a first request to access a first version of media content, wherein the first identity is detected based on first video content captured of the first user;
   providing, in response to the first request and based on detecting the first identity, access to the first version of the media content and access to an editing application for editing the first version of the media content;
   receiving, from a controller and via the editing application, a first input for editing the first version of the media content;
   editing, based on the first input, the first version of the media content to create a second version of the media content;
   receiving, from the controller, a second request to access the first version of the media content;
   detecting a second identity of a second user that sent the second request to access the first version of the media content, wherein the second identity is detected based on second video content captured of the second user; and
   providing, in response to the second request to access the first version of the media content and based on detecting the second identity, access to the second version of the media content.

2. The system of claim 1, wherein the operations further comprise receiving the first request to access the first version of the media content from the controller.

3. The system of claim 1, wherein the operations further comprise dividing the first version of the media content into multiple portions.

4. The system of claim 3, wherein the operations further comprise enabling a selection of one or more of the multiple portions.

5. The system of claim 1, wherein the operations further comprise categorizing the first version and the second version of the media content.

6. The system of claim 1, wherein the operations further comprise pushing the second version of the media content to a social media application.

7. The system of claim 1, wherein the operations further comprise receiving a second input to edit the second version of the media content.

8. The system of claim 7, wherein the operations further comprise editing the second version of the media content to generate a third version of the media content.

9. The system of claim 1, wherein the operations further comprise providing access, in response to the second request, access to a pre-edited version of the first version of the media content.

10. The system of claim 1, wherein the operations further comprise pixelating a portion of the first version of the media content to create the second version of the media content.

11. The system of claim 1, wherein the operations further comprise adding text content to the first version of the media content to create the second version of the media content.

12. The system of claim 1, wherein the operations further comprise overdubbing a portion of the first version of the media content to create the second version of the media content.

13. The system of claim 1, wherein the operations further comprise removing a portion of the first version of the media content to create the second version of the media content.

14. A method, comprising:
    detecting a first identity of a first user that sent a first request to access a first version of media content, wherein the first identity is detected based on first video content captured of the first user;
    providing, in response to the first request and based on detecting the first identity, access to the first version of the media content and access to an editing application for editing the first version of the media content;
    receiving, from a controller and via the editing application, a first input for editing the first version of the media content;
    editing, based on the first input, the first version of the media content to create a second version of the media content, wherein the editing is performed by utilizing instructions from a memory that are executed by a processor;
    receiving, from the controller, a second request to access the first version of the media content;
    detecting a second identity of a second user that sent the second request to access the first version of the media content, wherein the second identity is detected based on second video content captured of the second user; and
    providing, in response to the second request to access the first version of the media content and based on detecting the second identity, access to the second version of the media content.

15. The method of claim 14, further comprising receiving the first request to access the first version of the media content from the controller.

16. The method of claim 14, further comprising removing a portion of the first version of the media content to create the second version of the media content.

17. The method of claim 14, further comprising adding content to the first version of the media content to create the second version of the media content.

18. The method of claim 14, further comprising adjusting content of the first version of the media content to create the second version of the media content.

19. The method of claim 14, further comprising providing access, in response to the second request, access to a pre-edited version of the first version of the media content.

20. A computer-readable device comprising instructions, which when executed by a processor, cause the processor to perform operations comprising:
    detecting a first identity of a first user that sent a first request to access a first version of media content, wherein the first identity is detected based on first video content captured of the first user;

providing, in response to the first request and based on detecting the first identity, access to the first version of the media content and access to an editing application for editing the first version of the media content;

receiving, from a controller and via the editing application, a first input for editing the first version of the media content;

editing, based on the first input, the first version of the media content to create a second version of the media content;

receiving, from the controller, a second request to access the first version of the media content;

detecting a second identity of a second user that sent the second request to access the first version of the media content, wherein the second identity is detected based on second video content captured of the second user; and providing, in response to the second request to access the first version of the media content and based on detecting the second identity, access to the second version of the media content.

\* \* \* \* \*